United States Patent
Bala

(10) Patent No.: US 9,705,324 B2
(45) Date of Patent: Jul. 11, 2017

(54) CONVERTER SYSTEM FOR AC POWER SOURCES

(71) Applicant: ABB Technology AG, Zurich (CH)

(72) Inventor: Sandeep Bala, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 808 days.

(21) Appl. No.: 14/095,666

(22) Filed: Dec. 3, 2013

(65) Prior Publication Data

US 2015/0155708 A1    Jun. 4, 2015

(51) Int. Cl.
*H02J 1/08* (2006.01)
*H02J 3/38* (2006.01)
*H02M 7/08* (2006.01)
*H02M 7/10* (2006.01)

(52) U.S. Cl.
CPC ............... *H02J 1/08* (2013.01); *H02J 3/382* (2013.01); *H02J 3/386* (2013.01); *H02M 7/08* (2013.01); *H02M 7/10* (2013.01); *H02J 3/383* (2013.01); *Y02E 10/563* (2013.01); *Y02E 10/763* (2013.01); *Y10T 307/359* (2015.04)

(58) Field of Classification Search
CPC .... H02J 1/08; H02J 3/382; H02J 3/386; H02J 3/383; H02M 7/10; H02M 7/08; Y02E 10/563; Y02E 10/763; Y10T 307/359
USPC .......................................................... 307/25
See application file for complete search history.

(56) References Cited

U.S. PATENT DOCUMENTS

| | | | | |
|---|---|---|---|---|
| 4,308,575 A | * | 12/1981 | Mase | H02J 1/02 |
| | | | | 174/DIG. 17 |
| 5,834,855 A | * | 11/1998 | Chiba | H02J 13/002 |
| | | | | 307/31 |

(Continued)

FOREIGN PATENT DOCUMENTS

| EP | 2280469 A1 | 2/2011 |
|---|---|---|
| EP | 2372862 A2 | 10/2011 |

(Continued)

OTHER PUBLICATIONS

Garcés, et al. "Coordinated control of series-connected offshore wind park based on matrix converters." Wind Energy 2012, vol. 15, No. 6. Sep. 2012. pp. 827-845.

(Continued)

*Primary Examiner* — Jared Fureman
*Assistant Examiner* — Michael Warmflash
(74) *Attorney, Agent, or Firm* — Taft Stettinius & Hollister LLP

(57) ABSTRACT

A converter system for coupling to an ac power source includes a rectifier and a bi-directional converter. The rectifier has a first set of terminals inductively coupled to an ac power source and a second set of terminals coupled in series with a series dc bus, and is operable to convert ac power at the first set of terminals to dc power at the second set of terminals. The bi-directional converter has a first set of terminals coupled to the ac power source and a second set of terminals coupled to a parallel bus, and is operable to transfer power from the ac source to the parallel bus in a first operating mode and transfer power from the parallel bus to the series dc bus via the rectifier in a second operating mode. A corresponding power generation network and power transmission method are also provided.

24 Claims, 7 Drawing Sheets

(56) References Cited

U.S. PATENT DOCUMENTS

| | | | |
|---|---|---|---|
| 6,795,322 B2 * | 9/2004 | Aihara | H02J 9/061 307/64 |
| 7,633,770 B2 | 12/2009 | Datta et al. | |
| 8,044,537 B2 | 10/2011 | Asplund et al. | |
| 8,373,307 B2 | 2/2013 | Sihler et al. | |
| 2004/0075343 A1 * | 4/2004 | Wareham | H02J 3/14 307/39 |
| 2009/0152947 A1 * | 6/2009 | Wang | H02J 1/14 307/24 |
| 2010/0133901 A1 | 6/2010 | Zhang et al. | |
| 2011/0175451 A1 * | 7/2011 | Moon | H02J 9/062 307/66 |
| 2013/0088900 A1 * | 4/2013 | Park | H02J 9/062 363/71 |

FOREIGN PATENT DOCUMENTS

| | | | | |
|---|---|---|---|---|
| NO | WO 2012093942 A1 * | 7/2012 | | H02J 3/386 |
| WO | 0152379 A2 | 7/2001 | | |

OTHER PUBLICATIONS

Macken, et al "A DC bus system for connecting offshore wind turbines with the utility system." Proceedings of European Wind Energy Conference, 2001. pp. 1030-1035.

Lundberg, Stefan. "Configuration study of large wind parks." Thesis for the Degree of Licentiate of Engineering. Chalmers University of Technology, 2003. pp. 1-124.

Holtsmark, et al. "An All-DC Offshore Wind Farm With Series-Connected Turbines: An Alternative to the Classical Parallel AC Model." IEEE Transactions on Industrial Electronics, vol. 60, No. 6. Jun. 2013. pp. 2420-2428.

Jovcic, Dragan. "Offshore wind farm with a series multiterminal CSI HVDC." Electronic Power Systems Research, vol. 78, No. 4. Apr. 2008. pp. 747-755.

Meyer, et al. "Control and design of dc grids for offshore wind farms." IEEE Transactions on Industrial Applications, vol. 43, No. 6. Nov./Dec. 2007. pp. 1475-1482.

Veilleux, et al. "Interconnection of direct-drive wind turbines using a distributed HVDC converter station." Proceedings of the 35th IEEE IECON. Nov. 2009. pp. 584-589.

Nishikata, et al. "A new interconnecting method for wind turbine/generators in a wind farm and basic performances of the integrated system." IEEE Transactions on Industrial Electronics, vol. 57, No. 2. Feb. 2010. pp. 468-475.

Lee, et al. "Wind power collection and transmission with series connected current source converters." Proceedings of the 14th European Conference on Power Electronics and Applications. Aug. 30-Sep. 1, 2011. pp. 1-10.

Lundberg, Stefan. "Wind Farm Configuration and Energy Efficiency Studies—Series DC Versus AC Layouts." Thesis for the Degree of Doctor of Philosophy. Chalmers University of Technology, 2006. pp. 1-175.

Mogstad, et al. "A power conversion system for offshore wind parks." Proceedings of the 34th IEEE IECON. Nov. 2008. pp. 2106-2112.

Shmilovitz, et al. "Distributed Maximum Power Point Tracking in Photovoltaic Systems—Emerging Architectures and Control Methods." Automatika, vol. 53, Issue 2. Apr. 2012. pp. 142-155.

* cited by examiner

CONVERTER SYSTEM FOR AC POWER SOURCES

TECHNICAL FIELD

The instant application relates to collection and transmission of energy from multiple ac sources such as wind, wave, and tidal power turbine-generators and photovoltaic (PV) arrays with inverters.

BACKGROUND

Power generation networks aim for cost-effective collection of energy at a high enough voltage for transmission while extracting maximum power from ac sources such as wind, wave, or tidal turbine-generators or PV arrays with inverters. Conventional approaches for achieving high voltages for collection and/or transmission by such power generation networks include: parallel connection of dc or ac sources (e.g. wind turbines and converters) followed by a step-up transformer and/or converter; series connection of ac sources (e.g. in a cascaded H-bridge configuration); series connection of dc sources (e.g. wind turbines and rectifiers, or PV cells/modules); and series connection of PV cells/sub-modules and fractional converters to balance power and avoid partial shading. In the case of a series connection of ac sources, a cost-effective solution is desired that provides: (1) proper isolation of the ac sources; (2) proper control to extract maximum power when the power generated from the ac sources is different; and (3) proper fault handling.

SUMMARY

According to embodiments described herein, power from a group of ac sources such as wind, wave, or tidal turbine-generators or PV arrays with inverters is collected and transmitted over a long distance. The power from each ac source is rectified and these rectified outputs are connected in series to achieve high voltage dc before transmission over a long distance. A parallel balancing bus is interfaced to each ac source through respective bidirectional power converters. The parallel balancing bus is used to manage variations in the powers generated by the individual ac sources. These and other features are described in more detail later herein.

According to an embodiment of a converter system for coupling to an ac power source, the converter system comprises a rectifier and a bi-directional converter. The rectifier has a first set of terminals inductively coupled to an ac power source and a second set of terminals coupled in series with a series dc bus. The rectifier is operable to convert ac power at the first set of terminals to dc power at the second set of terminals. The bi-directional converter has a first set of terminals coupled to the ac power source and a second set of terminals coupled to a parallel bus. The bi-directional converter is operable to transfer power from the ac source to the parallel bus in a first operating mode and transfer power from the parallel bus to the series dc bus via the rectifier in a second operating mode.

According to an embodiment of a power generation network, the power generation network comprises a series dc bus, a parallel bus and a plurality of converter systems for coupling to different ac power sources. Each of the converter systems comprises a rectifier and a bi-directional converter. The rectifier has a first set of terminals inductively coupled to one of the ac power sources and a second set of terminals coupled in series with the series dc bus. The rectifier is operable to convert ac power at the first set of terminals to dc power at the second set of terminals. The bi-directional converter has a first set of terminals coupled to the same ac power source as the rectifier and a second set of terminals coupled to the parallel bus. The bi-directional converter is operable to transfer power from the ac source to the parallel bus in a first operating mode and transfer power from the parallel bus to the series dc bus via the rectifier in a second operating mode.

According to an embodiment of a method of transmitting power from a plurality of ac sources to a grid, each of the ac power sources being coupled to a first set of terminals of a respective converter system, a second set of terminals of each of the converter systems being coupled in series with a series dc bus, and a third set of terminals of each of the converter systems being coupled in parallel with a parallel bus, the method comprises: coupling each of the ac power sources to a first set of terminals of a respective converter system; coupling a second set of terminals of each of the converter systems to a series dc bus; coupling a third set of terminals of each of the converter systems to a parallel bus; transferring power from the ac sources to the series dc bus through the first and second sets of terminals of the converter systems; transferring power from each of the ac sources generating power above a reference power value to the parallel bus through the first and third sets of terminals of the converter systems coupled to each ac source generating power above its reference power value; and transferring power from the parallel bus to the series dc bus through the second and third sets of terminals of each of the converter systems coupled to an ac source generating power below its reference power value.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
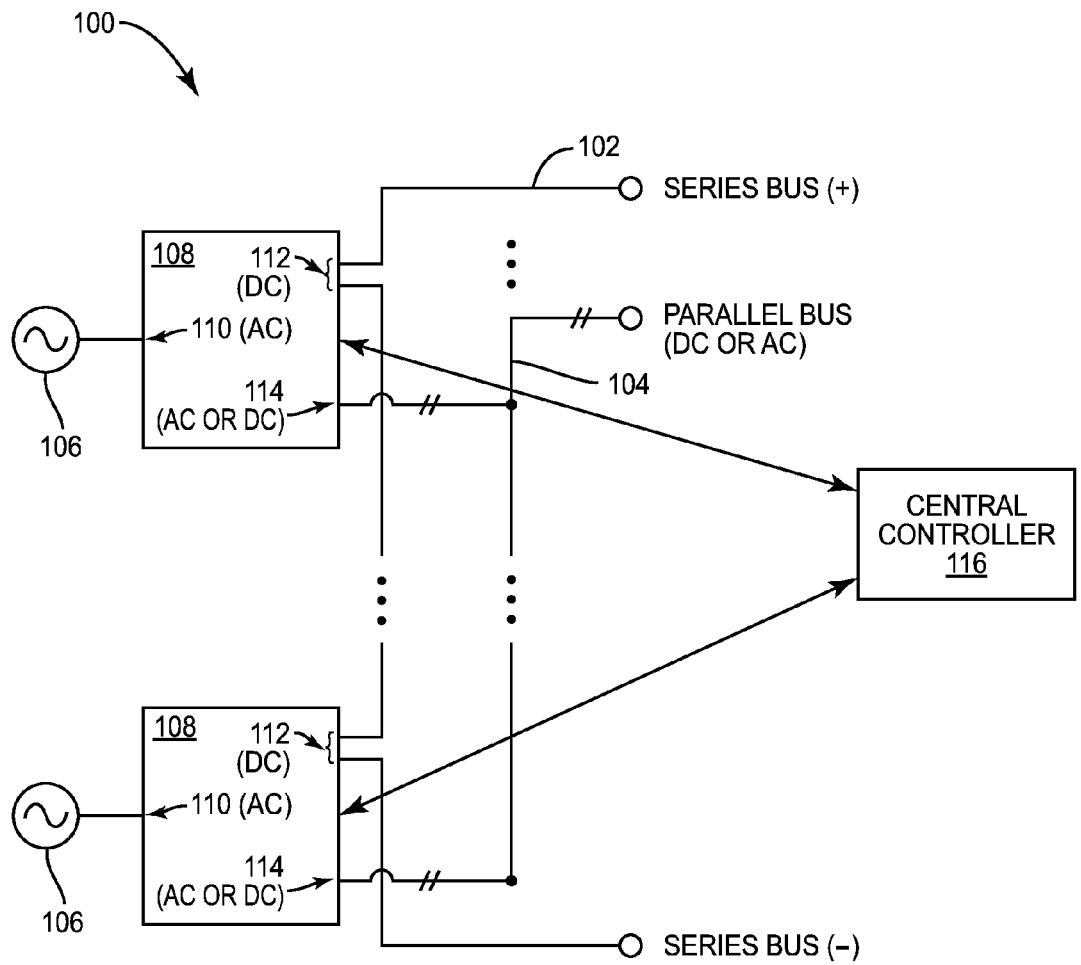
FIG. 1 illustrates a block diagram of an embodiment of a power generation network which includes a series dc bus for providing a medium or high voltage dc output and a parallel bus for use in balancing out variations in generated power from different ac sources included in the network.
Figure 2:
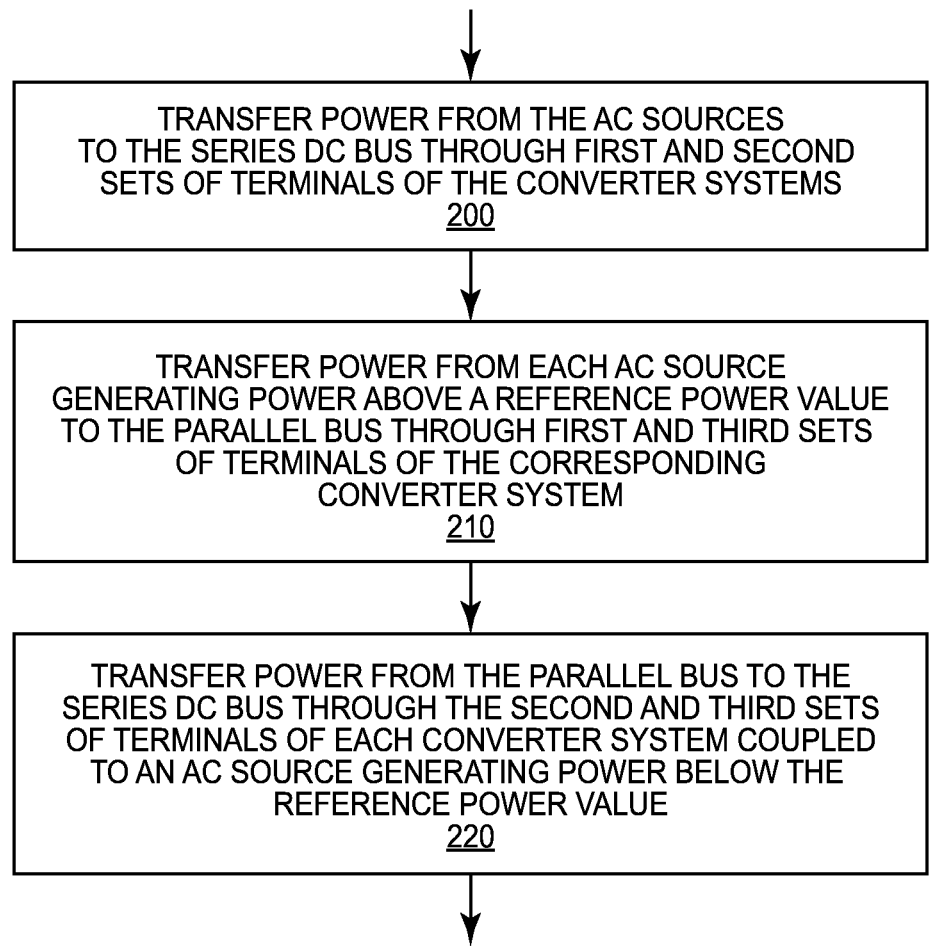
FIG. 2 illustrates a diagram of an embodiment of a method of transmitting power from a plurality of ac sources to a grid.

FIG. 1 illustrates an embodiment of a power generation network 100 that collects power from a group of ac sources and transmits the power over a long distance. FIG. 2 illustrates an embodiment of a corresponding method of transmitting power by the power generation network 100.

The power generation network 100 includes a series dc bus 102, a parallel bus 104 and a plurality of ac sources 106. Some or all of the ac sources 106 can produce native ac power such as wind, wave, or tidal turbine-generators. Some or all of the ac sources 106 can produce native dc power which is then locally inverted to ac prior to coupling to the series dc bus 102, such as PV arrays with inverters. In each case, the power generation network 100 also includes a plurality of converter systems 108 for coupling to the different ac power sources 106.

Each of the ac power sources 106 is coupled to a first set of terminals 110 of the respective converter system 108. In the case of a PV array with inverter, the inverter can be considered to be integrated into the ac source 106. A second set of terminals 112 of each of the converter systems 108 is coupled in series with the series dc bus 102. A third set of terminals 114 of each of the converter systems 108 is coupled in parallel. The dc output (second set) terminals 112 of the converter systems 108 are series-connected to yield a medium voltage (MV) or high voltage (HV) at the output of the series dc bus 102. The other set of converter output terminals 114 are parallel-connected to the parallel bus 104. The parallel bus 104 can be ac or dc, and is used to balance out variations in the generated power from the different ac sources 106.

In more detail, power is transferred from the ac sources 106 to the series dc bus 102 through the first and second sets of terminals 110, 112 of the converter systems 108 (FIG. 2, Block 200). Power is transferred to or from the parallel bus 104 by each of the converter systems 108 depending on the amount of power generated by the ac source 106 coupled to that converter system 108. For example in a first operating mode, power is transferred from each of the ac sources 106 generating power above a corresponding reference power value to the parallel bus 104 through the first and third sets of terminals 110, 114 of the converter systems 108 coupled to each ac source 106 generating power above its reference power value (FIG. 2, Block 210). Conversely in a second operating mode, power is transferred from the parallel bus 104 to the series dc bus 102 through the second and third sets of terminals 112, 114 of each of the converter systems 108 coupled to an ac source 106 generating power below its reference power value (FIG. 2, Block 220).

As such, ac sources 106 generating power above the reference power values assigned to these sources 106 contribute a fraction of the total power being generated by these ac sources 106 to the parallel bus 104 through the corresponding converter system 108. This power in turn is transferred to the series dc 102 bus through each converter system 108 coupled to an ac source 106 operating below the reference power value. As such, the converter systems 108 output the same current to the series DC bus 102 even if the ac power sources 106 generate unequal power. In one embodiment, 40% or less of the total power output by ac sources 106 generating above their reference power values is diverted to the parallel bus 104. In general, the converter systems 108 can be assigned the same reference power value or different reference power values. In any case, for each ac power source 106 and converter system 108, the corresponding reference power value can be calculated and adjusted over time to account for changing conditions at the ac power sources 106. Broadly, the reference power value assigned to a particular converter system 108 is the value of power that the converter system 108 should present at the output of its rectifier in order to ensure proper operation when the rectifiers of multiple converter systems 108 are coupled in series with the series dc bus 102.

The power generation network 100 further includes a controller for controlling operation of the converter systems 108, including determining the corresponding reference power value for each converter systems 108 and setting the converter systems 108 in the first operating mode or the second operating mode depending on whether the individual converter systems 108 are generating above or below the assigned reference power value. The controller can determine the reference power values based on information relating to the aggregate power drawn from the series dc bus 102, so that the converter systems 108 output approximately the same current at the second set of converter system terminals 112 even if the ac power sources 106 generate unequal power. The controller is a centralized controller in FIG. 1, comprising a single controller 116 linked e.g. by a wired or wireless connection to each of the converter systems 108. The information relating to the aggregate power drawn from the series dc bus 102 can be provided to the centralized controller 116 by a grid-side converter such as a current source converter that draws power from the series dc bus 102 and operates at variable dc bus voltage. The grid-side converter is not shown in FIG. 1 for ease of illustration. The centralized controller 116 can determine the mode of each converter system 108 based on the aggregate power draw information received from the grid-side converter, the actual power of each of the ac sources 106, and the reference power values so that the converter systems 108 output approximately the same current even if the ac power sources 106 generate unequal power.

In one embodiment, the centralized controller 116 determines the actual power of each of the ac sources 106 based on at least one of the voltage and current of each of the ac sources 106. The centralized controller 116 can sense or measure these parameters, or this information can be provided to the centralized controller 116.

The centralized controller 116 determines the reference power values based on the aggregate power draw information and the actual power generated by each of the ac sources 106. The centralized controller 116 sets the converter systems 108 coupled to an ac source 106 having an actual output power above their respective reference power value in the first operating mode (FIG. 2, Block 210), and sets the converter systems 108 coupled to an ac source 106 having an actual output power below their respective reference power value in the second operating mode (FIG. 2, Block 220).

In another embodiment, the centralized controller 116 adjusts the amount of power transferred by each of the converter systems 108 into the parallel bus 104 and observes changes in the actual power locally generated by the ac sources 106 in response to these adjustments. The centralized controller 116 then sets the mode of the converter systems 108 based on the adjustments and observations made by the controller 116, so that each of the ac sources 106 generates maximum power.

In addition to transferring real power to or from the parallel bus 104, the bi-directional converter included in a converter system 108 can control the reactive power of the corresponding ac source 106 by ensuring the supply of the correct amount of reactive power for the ac source 106. A typical ac source 106 may require operation at non-unity power factor to ensure maximum power can be drawn from that source 106. In this case, VAR (volt-ampere reactive) power would need to be provided by the bi-directional converter of the corresponding converter system 108.

Figure 3:
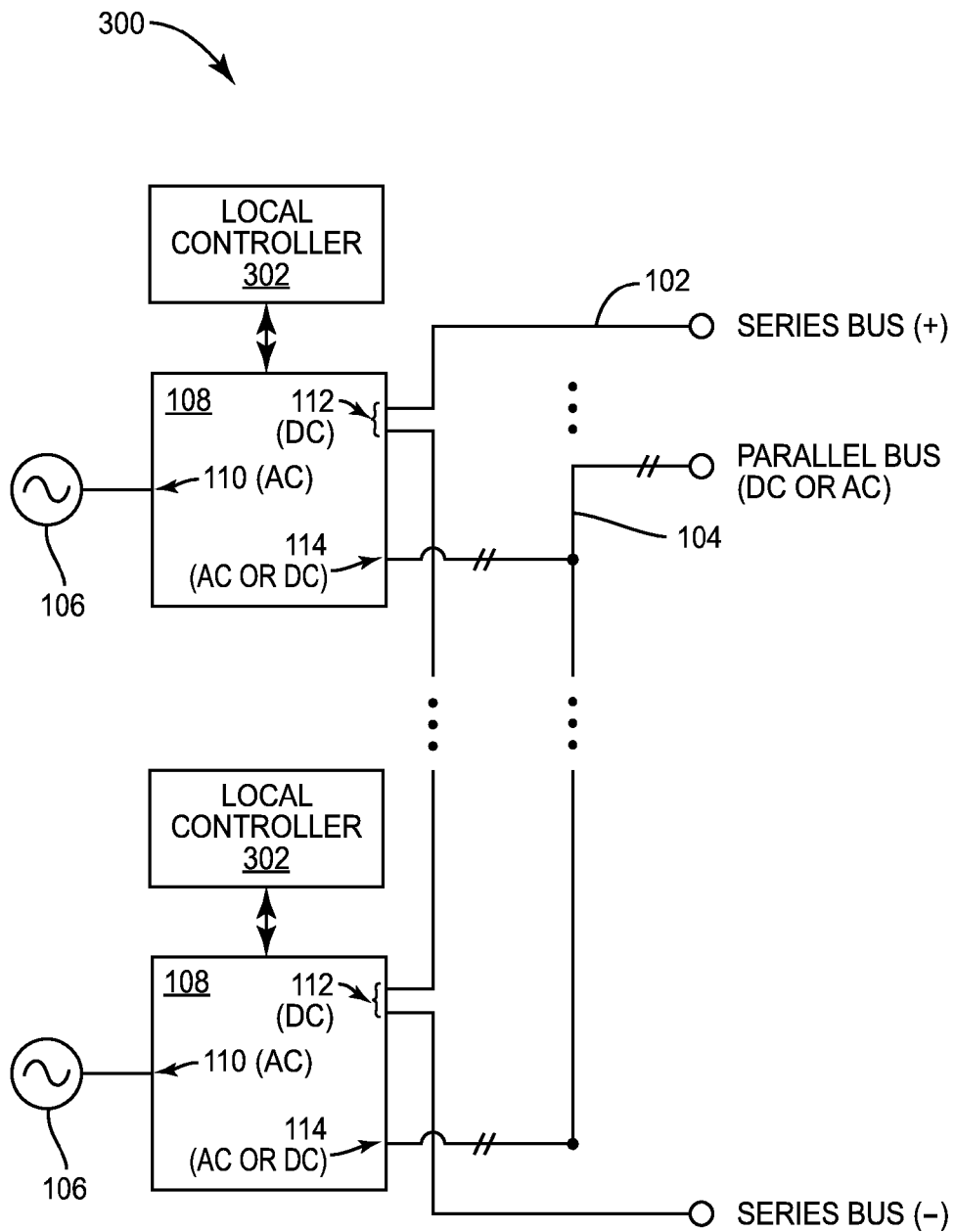
FIG. 3 illustrates a block diagram of another embodiment of a power generation network which includes a series dc bus for providing a medium or high voltage dc output and a parallel bus for use in balancing out variations in generated power from different ac sources included in the network.

FIG. 3 illustrates another embodiment of a power generation network 300 that collects power from a group of ac sources 106 and transmits the power over a long distance via a series dc bus 102. The embodiment shown in FIG. 3 is similar to the one shown in FIG. 1, however, the controller is a distributed controller comprising a plurality of local controllers 302 each of which is collocated with and linked, e.g. by a wired or wireless connection, to one of the converter systems 108. The distributed controller can implement any of the control operations previously described in connection with FIG. 1, provided the appropriate information is provided to or measured by the local controllers 302 such as the reference power value, the aggregate power draw information and the actual power generated by the ac sources 106.

Figure 4:
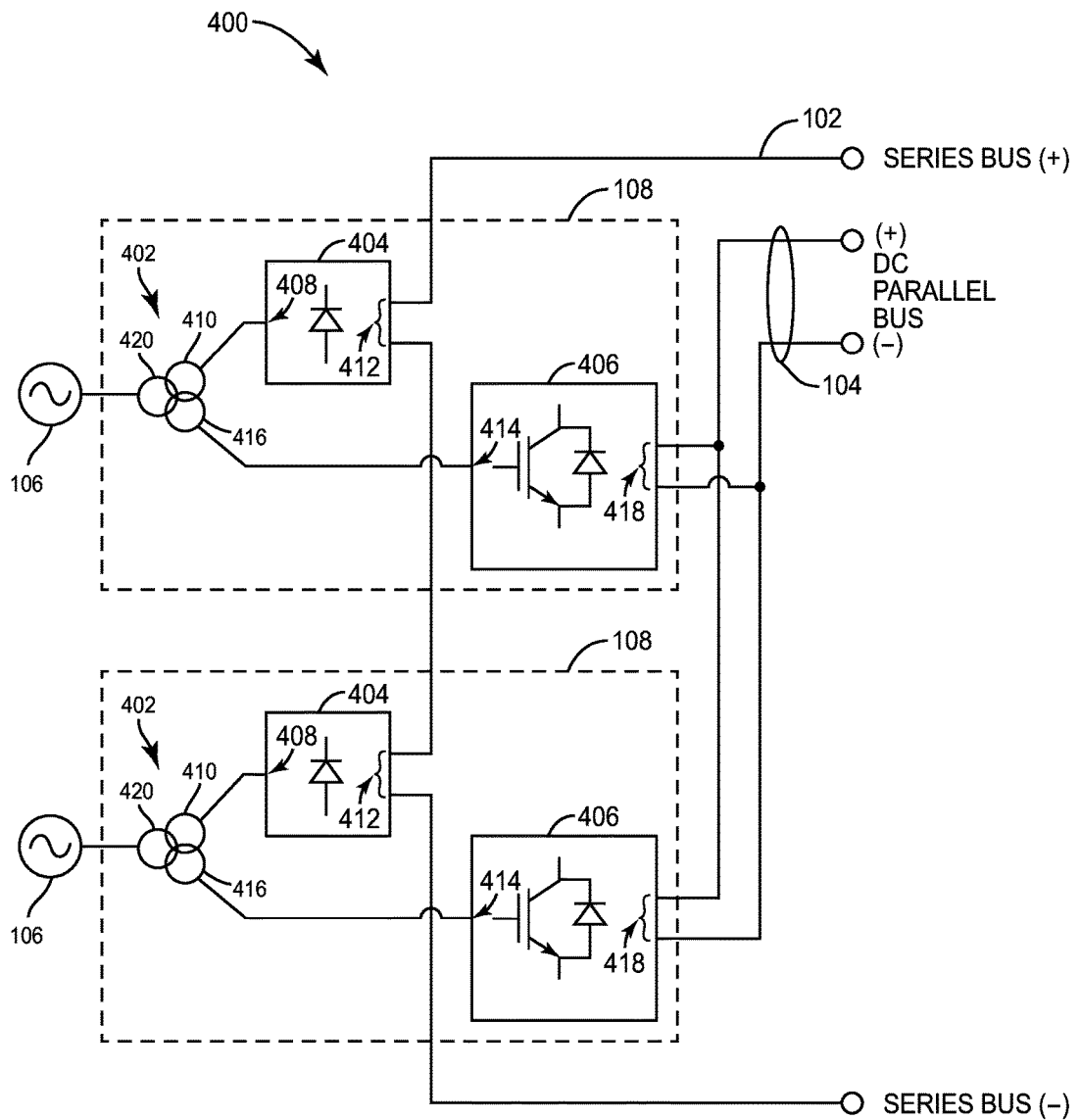
FIG. 4 illustrates a block diagram of an embodiment of the power converter systems included in the power generation networks of FIGS. 1 and 3.

FIG. 4 illustrates yet another embodiment of a power generation network 400 that collects power from a group of ac sources 106 and transmits the power over a long distance via a series dc bus 102. Each converter system 108 comprises a multi-winding transformer 402, a rectifier 404 and a bi-directional converter 406. The parallel bus 104 with bi-directional power converters 406 enables the use of a simpler rectifier 404 in the high power series path. Also, galvanic isolation is provided by the transformer 402 interposed between the ac sources 106 and the dc output.

In more detail, each rectifier 404 has a first set 408 of terminals inductively coupled to an ac power source 106 via a first winding 410 of the transformer 402, and a second set of terminals 412 coupled in series with the series dc bus 102. The rectifier 402 converts ac power at the first set of terminals 408 to dc power at the second set of terminals 412. In one embodiment the rectifier 404 is a diode rectifier as shown in FIG. 4. A diode rectifier is bypassed if there is no ac input. Also, rectifier diodes are typically so-called press-pack devices and fail short. So even in case of device failures, the system is still resilient. In another embodiment, the rectifier 404 is a thyristor. In either case, all of the rectifier outputs are connected in series to form the series dc bus 102.

The bi-directional converter 406 (shown as an ac-dc converter in FIG. 4) has a first set of terminals 414 inductively coupled to the same ac power source 106 as the rectifier 404 via a second winding 416 of the transformer 402, and a second set of terminals 418 coupled to the parallel bus 104. All of the bi-directional converter outputs are connected in parallel to form the parallel bus 104. The first set of terminals 408 of the rectifier 404 is galvanically isolated from the first set of terminals 414 of the bi-directional converter 406 by the multi-winding transformer 402. A third winding 420 of the transformer 402 is connected to the respective ac source 106.

Each rectifier 404 and the winding 410 of the transformer 402 connected to each rectifier 404 are rated for the full power of the ac source 106 inductively coupled to that rectifier 404. The ac source 106 and the rectifier 404 are insulated (relative to ground) to the maximum series bus voltage by the transformer 402. Each bi-directional converter 406 and the winding 416 of the transformer 402 connected to each bi-directional converter 406 are only fractionally rated (typically 40% or less of the power rating of the rectifier). So for a 10 MW ac source 106, the corresponding rectifier 404 is rated at 10 MVA and the corresponding bi-directional converter 406 is rated at 4 MVA or less.

The controller of the power generation network 400 ensures that maximum power is extracted from the local ac sources 106. To this end, each of the bi-directional converters 406 transfers power from the ac source 106 to the parallel bus 104 in a first operating mode (FIG. 2, Block 210) and transfers power from the parallel bus 104 to the series dc 102 bus via the corresponding rectifier 404 in a second operating mode (FIG. 2, Block 220). The operating mode of the bi-directional converters 406 depends on the amount of power generated by the ac sources 106.

In general, it can be assumed that the dc output voltages and currents (at the maximum power point, without any balancing) of the N ac sources 106 are: $u_1, u_2, \ldots, u_N$, and $i_1, i_2, \ldots, i_N$, respectively. As an example, for an ac source such as a wind turbine generator, the values for $u_k$ and $i_k$ that result a maximum power harvested for a particular wind speed can be pre-computed or estimated by an appropriate maximum power point tracking algorithm; $u_k i_k$ would represent the maximum power that can be generated from the $k^{th}$ wind turbine generator given a certain availability of wind power. Let $i_s$ be the actual series dc output current and $u_s$ the total series voltage, which are presented to or by the grid-side series bus converter. The total series voltage is given by:

$$u_1+u_2+\ldots+u_N=u_s \quad (1)$$

The currents from the converter systems 108 into the parallel bus 104 are $i_{b1}, i_{b2}, \ldots, i_{bN}$. Let $i_b$ be the current from the grid-side parallel bus converter and $u_b$ the parallel bus voltage. The current from the grid-side parallel bus converter is given by:

$$i_{b1}+i_{b2}+\ldots+i_{bN}=i_b \quad (2)$$

Some of the power from each rectifier 404 is diverted into the parallel bus 104 and the remaining power is the power injected into the series dc bus 102, as given by:

$$u_k i_k - u_b i_{bk} = u_k i_s, \text{ where } k=1,2,\ldots,N \quad (3)$$

Adding up these N equations yields:

$$(u_1 i_1+u_2 i_2+\ldots+u_N i_N)-u_b(i_{b1}+i_{b2}+\ldots+i_{bN})=(u_1+u_2+\ldots+u_N)i_s \quad (4)$$

which gives the total power balance equation:

$$(u_1 i_1+u_2 i_2+\ldots+u_N i_N)-u_b i_b=u_s i_s \quad (5)$$

In a first case, there is a grid-side parallel bus converter and $u_b$ is regulated by this converter. The value of $i_b$ can be judiciously chosen so as to minimize the total power rating and/or operating losses of the bidirectional converters 406 and the grid-side parallel bus converter. As such, the amount of power injected into the parallel bus 104 by the $k^{th}$ converter system 108 is given by:

$$u_b i_{bk}=u_k(i_k-i_s)=u_k(i_k-((u_1 i_1+u_2 i_2+\ldots u_N i_N)-i_b i_b)/(u_1+u_2+\ldots u_N)) \quad (6)$$

In a second case, there is no grid-side parallel bus converter and $i_b=0$. In this case, the amount of power injected into the parallel bus 104 by the $k^{th}$ converter system 108 simplifies to:

$$u_b i_{bk}=u_k(i_k-(u_1 i_1+u_2 i_2+\ldots+u_N i_N)/(u_1+u_2+\ldots+u_N)) \quad (7)$$

The reference power value of a converter system 106 is the value of power that the converter system 106 should present at the output of its rectifier 404 in order to ensure proper operation when the rectifiers 404 of multiple converter systems 106 are coupled in series with the series dc bus 102. For the kth converter system 106, the reference power value is:

$$p_{ref} = u_k i_s = (u_k/u_s)(u_s i_s) \quad (8)$$

Using the equation (5) above for the value of $u_s i_s$, $$p_{ref} = (u_k/u_s)((u_1 i_1 + u_2 i_2 + \ldots + u_N i_N) - u_b i_b) \quad (9)$$

So if the (centralized or distributed) controller for a particular ac source 106 has information about the maximum total power that can be generated from the ac sources 106, the parallel bus voltage, the grid-side parallel bus converter current, the ac source voltage and the total series dc bus voltage, then calculating the reference power value follows easily. Some of this information can be provided by the grid-side converters and the rest measured locally. Alternatively, the reference power value can be calculated if information is shared across the ac sources 106.

The preceding paragraphs have described reference power value calculation for operation of the ac sources 106 at their so-called maximum power points, but a similar method of reference power value calculation can apply to the operation of the ac sources 106 at any other preferred operating point. Examples of other preferred operating points include points of maximum efficiency, points set by economic dispatch, points of minimum system stress, etc. As such, the balancing techniques described herein need only be aware of the power generated by the ac sources 106 at these preferred operating. These preferred operating point power values are typically obtained by estimation from various measured or assigned data.

In a specific embodiment, two 3-phase ac sources 106 are each rated at 10 MW and 6.9 kV line-to-line voltage at full power, which results in 8 kV dc output from the rectifier 404 at 1250 A. The ac sources 106 can operate at different power and voltage levels depending on the characteristics of the sources 106. In particular, the power and voltage levels of the ac sources 106 depend on the maximum power point characteristics of the sources 106. These are the voltages and currents at the output of the rectifier 404 if the sources 106 were not connected in series and were operating at their maximum power points. For example, the first source may be operating at 8 MW with $u_1$=7.27 kV and $i_1$=1100 A and the second source may be operating at 6 MW with $u_2$=6 kV and $i_2$=1000 A. By applying the balancing techniques described herein, the bi-directional converter 406 of the first ac source 106 would be placed be in the first operating mode and inject $u_1$ $(i_1-(u_1 i_1+u_2 i_2)/(u_1+u_2))$=328.8 kW into the parallel bus 104. The bi-directional converter 406 of the second source 106 would be set in the second operating mode and receive−$(u_2$ $(i_2-(u_1 i_1+u_2 i_2)/(u_1+u_2))$=328.8 kW from the parallel bus 104. After the balancing, the first converter system 108 would supply to the series dc bus 102 (8000−328.8) kW=7.67 MW, which is the reference power value for the first source, and the second converter system 108 would supply to the series dc bus 102 (6000+328.8) kW=6.33 MW, which is the reference power value for the second source, in this purely illustrative example. The total power generated would still be 14 MW. The total series dc bus voltage would be (7.27+6) kV=13.27 kV and the series dc bus current would be 1055 A.

The controller is not shown in FIG. 4 for ease of illustration, but can be implemented in a centralized or distributed manner as previously described herein. In either case, operation of the rectifiers 404 and the bi-directional converters 406 are managed by the controller, including determining the corresponding reference power values based on information relating to aggregate power drawn from the series dc bus 102 and setting the bi-directional converters 406 in the first operating mode (FIG. 2, Block 210) or the second operating mode (FIG. 2, Block 220) as previously described in connection with FIGS. 1 and 2.

The power generation network controller can be centralized or distributed as previously described herein. A centralized controller is easier to implement when the converter systems 108 are physically close to each other. A distributed controller is easier to implement when the converter systems 108 are distant from each other. The main difference between centralized and distributed controllers is the availability of measured information at the various ac sources 106. In either case (centralized or distributed), the power generation network controller may communicate with the controller of a grid-side converter at the other end of the series dc bus 102 to ensure optimum operation of the overall system.

Figure 5:
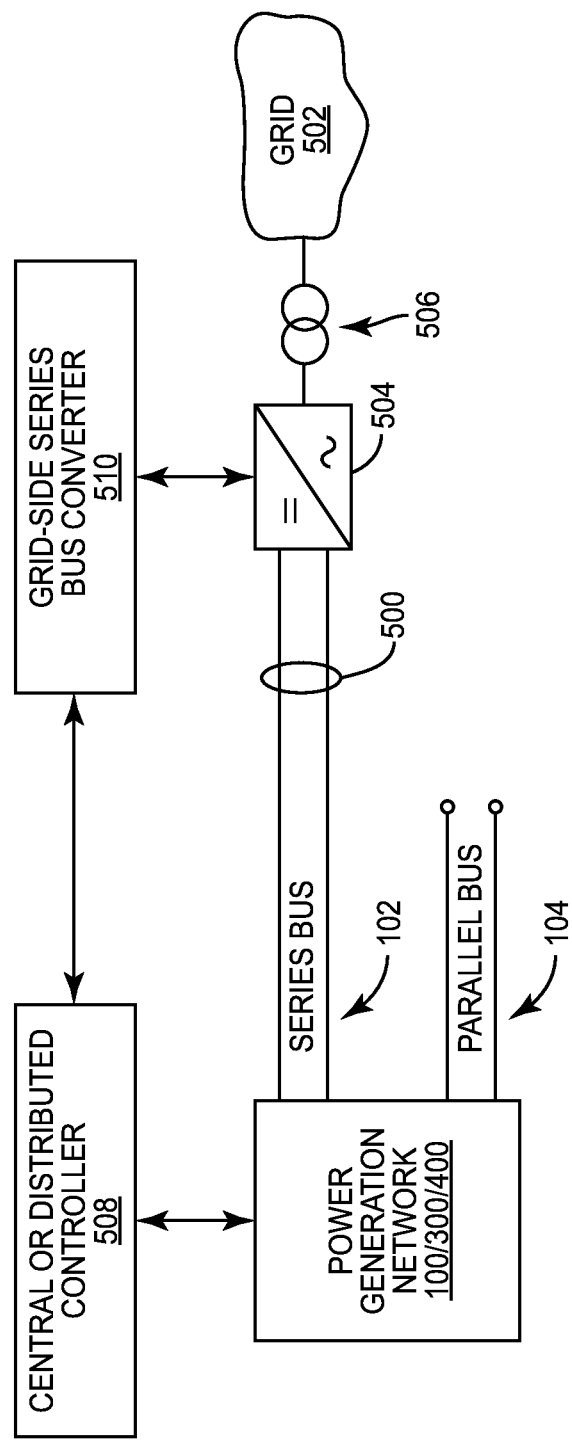
FIG. 5 illustrates a block diagram of an embodiment of the transmission of series-collected energy over a long cable and the subsequent connection to an ac grid through a grid-side converter that operates at variable dc bus voltage.

FIG. 5 illustrates an embodiment of the transmission of the series-collected energy over a long cable 500 and the subsequent connection to an ac grid 502 through a grid-side series bus converter 504. For example in the case of tidal power turbine-generators, the power generation network 100/300/400 is located off shore and the grid-side series bus converter 504 is located on shore. The grid-side series bus converter 504 converts dc power supplied by the power generation network 100/300/400 to ac power, which is coupled e.g. to the grid 502 by a transformer 506. The controller 508 associated with the power generation network 100/300/400 controls operation of the converter systems 108 included in the power generation network 100/300/400 as previously described herein. A corresponding controller 510 for the grid-side series bus converter 504 controls operation at the other end of the series dc bus 102.

The grid-side series bus converter 504 regulates the series bus current to extract the maximum value from the aggregate of the ac sources 106. The voltage on the series dc bus 102 can vary from zero to a maximum dc voltage, and the grid-side series bus converter 504 allows such a voltage variation. The overall maximum power point tracking can be performed by the grid-side converter 504 and the balancing (individual maximum power point tracking) can be done locally at the ac sources 106. This enables maximum power extraction from the series connection. There may further be a communication between the controller 510 of the grid-side series bus converter 504 and the (centralized or distributed) controller 508 of the bi-directional converters 406 coupled to the individual ac sources 106, in order to coordinate the maximum power extraction.

The (centralized or distributed) controller 508 of the power generation network 100/300/400 can communicate with the controller 510 of the grid-side series bus converter 504 to ensure optimum operation of the overall system. For example, the controller 510 of the grid-side series bus converter 504 may communicate information about the total power drawn from the aggregate series connected system. The (centralized or distributed) controller 508 of the power generation network 100/300/400 can use this information together with information about maximum available power from the individual ac sources 106 to determine the balancing powers to be transferred through the bi-directional converters 406 to or from the parallel bus 104 which acts as a current balancing bus.

The actual power at each ac source 106 can be computed from measured data. The maximum available power at each ac source 106 can be estimated using this data. Typical data used for estimation of maximum available power include voltages, currents, or source power. For example in the case of wind turbines, wind speed measurements or turbine rotor speeds can be used as estimates for source power.

In case these data are unavailable, a perturb-and-observe method can be used to determine the power flows for the bi-directional converters 406. In this case, the (centralized or distributed) controller 508 of the power generation network 100/300/400 adjusts the amount of power transferred into or out of the parallel bus 104 (in concert for a centralized controller implementation or independently for a distributed controller implementation), and then observes the effect on actual power generated. If the power generated locally increases, then the power generation network controller 508 continues to adjust the power flow of the corresponding bi-directional converter 406. This perturb-and-observe process continues until the maximum power generation point for each ac source 106 is obtained.

Figure 6:
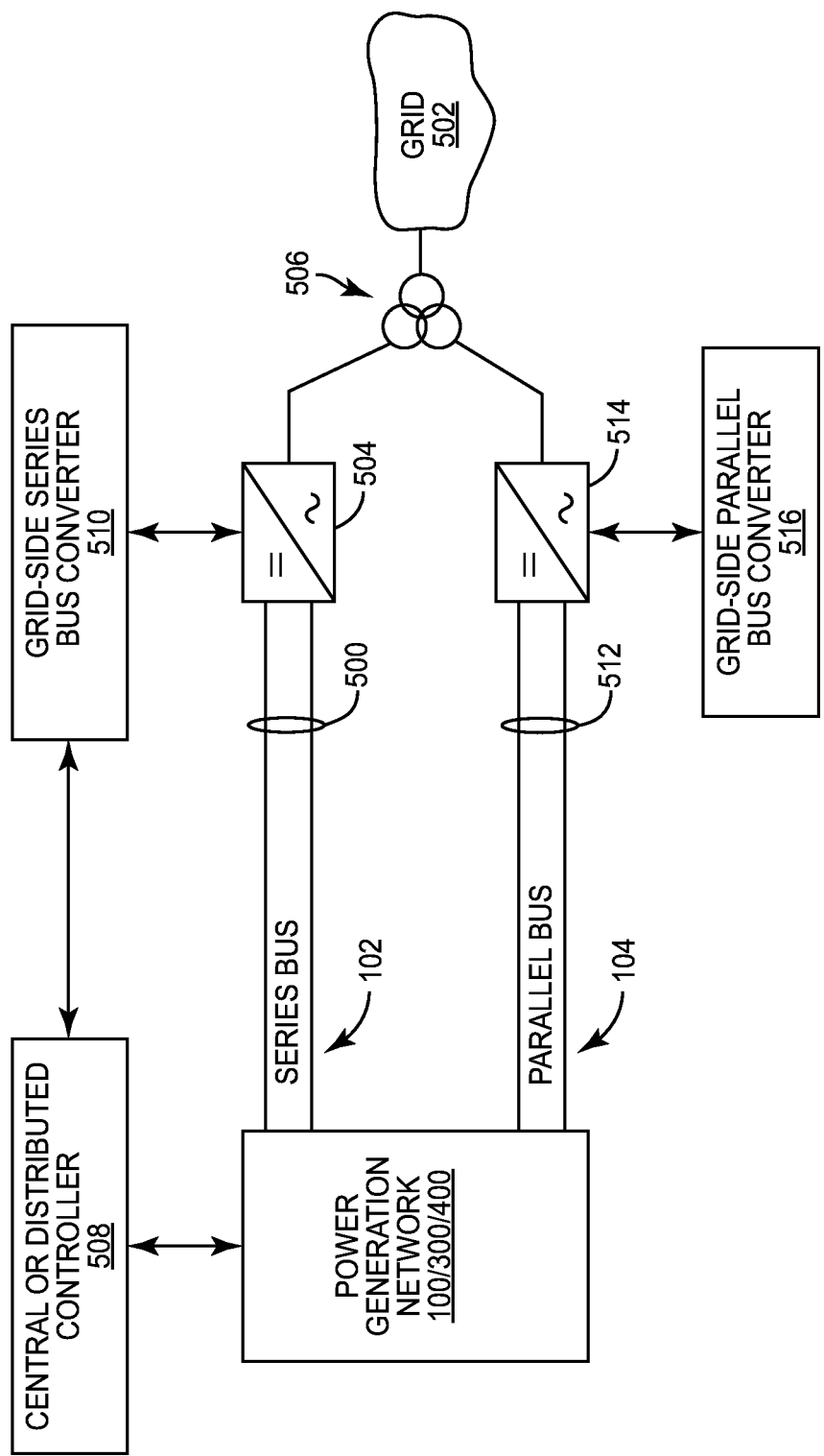
FIG. 6 illustrates a block diagram of another embodiment of the transmission of series-collected energy over a long cable and the subsequent connection to an ac grid through a grid-side converter that operates at variable dc bus voltage.

FIG. 6 illustrates another embodiment of the transmission of the series-collected energy over a long cable 500 and the subsequent connection to an ac grid 502 through a grid-side series bus converter 504. The embodiment shown in FIG. 6 is similar to the embodiment shown in FIG. 5, however, power on the parallel bus 104 is also transmitted over a long cable 512, albeit at a lower voltage than on the series dc bus 102, and interfaced to the same ac grid 502 through an additional grid-side converter 514 and a transformer 506. With this configuration, the parallel bus 104 can also be used to transmit auxiliary power to one or more auxiliary systems of the individual grid-side converters 504, 514 or corresponding controllers 510, 516 coupled to the grid 502 or to the auxiliary systems of the power generation network 100/300/400. This additional connection can also simplify the control of the overall system. The grid-side parallel bus converter 514 that couples the parallel bus 104 to the grid 502 regulates the parallel bus voltage.

Figure 7:
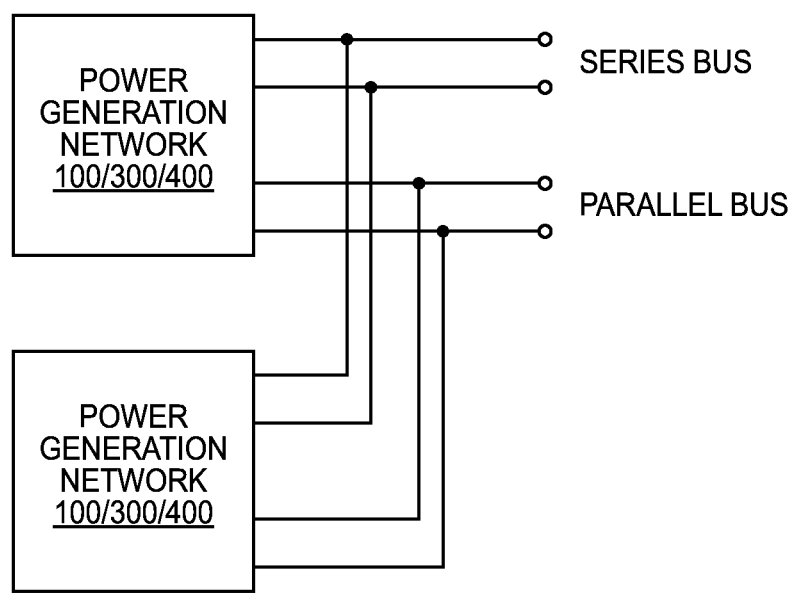
FIG. 7 illustrates a block diagram of an embodiment of two or more power generation networks connected in parallel for higher power transmission.

FIG. 7 illustrates an embodiment of two or more power generation networks 100/300/400 as previously described herein connected in parallel for higher power transmission.

The individual ac sources 106 of the power generation network(s) 100/300/400 can be separated from the overall circuit and bypassed to allow the rest of the system to operate. This can be achieved using low or medium voltage ac circuit breakers at the ac inputs 408 of the rectifiers 404. The ac breakers also interrupt the current fed from the corresponding ac source into dc faults in the series dc bus. The grid-side series bus converter 504 also reduces the dc voltage in case of dc faults in the series dc bus 102.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A converter system for coupling to an ac power source, the converter system comprising:
   a rectifier having a first set of terminals inductively coupled to an ac power source and a second set of terminals coupled in series with a series dc bus, the rectifier operable to convert ac power at the first set of terminals to dc power at the second set of terminals; and
   a bi-directional converter having a first set of terminals coupled to the ac power source and a second set of terminals coupled to a parallel bus, the bi-directional converter operable to transfer power diverted from the ac source that has not been injected into the series dc bus to the parallel bus in a first operating mode and transfer power from the parallel bus to the series dc bus via the rectifier in a second operating mode.

2. The converter system of claim 1, wherein the bi-directional converter has a power rating that is at most 40% of the power rating of the rectifier.

3. The converter system of claim 1, wherein the first set of terminals of the rectifier and the first set of terminals of the bi-directional converter are inductively coupled to the ac power source by a transformer.

4. The converter system of claim 1, wherein the rectifier is a diode rectifier.

5. The converter system of claim 1, further comprising a controller operable to control operation of the rectifier and the bi-directional converter, including setting the bi-directional converter in the first operating mode if the ac power source outputs power above a reference power value assigned to the converter system and setting the bi-directional converter in the second operating mode if the ac power source outputs power below the reference power value assigned to the converter system.

6. The converter system of claim 5, wherein the controller is operable to determine the reference power value assigned to the converter system based on information relating to aggregate power drawn from the series dc bus.

7. The converter system of claim 6, wherein the information relating to the aggregate power drawn from the series dc bus comprises maximum total power that can be generated by each ac source coupled to the series dc bus, the voltage of the parallel bus, current at a grid-side parallel bus converter coupled to the parallel bus, the voltage of the ac source and the total voltage of the series dc bus.

8. The converter system of claim 5, wherein the controller is operable to determine the reference power value assigned to the converter system so that the ac source operates at its maximum power point.

9. The converter system of claim 1, wherein the bi-directional converter is operable to control the reactive power of the ac source.

10. A power generation network, comprising:
    a series dc bus;
    a parallel bus; and
    a plurality of converter systems for coupling to different ac power sources, each of the converter systems comprising:
    a rectifier having a first set of terminals inductively coupled to one of the ac power sources and a second set of terminals coupled in series with the series dc bus, the rectifier operable to convert ac power at the first set of terminals to dc power at the second set of terminals; and a bi-directional converter having a first set of terminals coupled to the same ac power source as the rectifier and a second set of terminals coupled to the parallel bus, the bi-directional converter operable to transfer power diverted from the ac source that has not been injected into the series dc bus to the parallel bus in a first operating mode and transfer power from the parallel bus to the series dc bus via the rectifier in a second operating mode.

11. The power generation network of claim 10, further comprising a controller operable to control operation of the converter systems, including setting the bi-directional converter of each converter system in the first operating mode if the corresponding ac power source outputs power above a reference power value assigned to the converter system and setting the bi-directional converter of each converter system in the second operating mode if the corresponding ac power source outputs power below the reference power value assigned to the converter system.

12. The power generation network of claim 11, wherein the controller is operable to determine the reference power values assigned to the converter systems based on information relating to aggregate power drawn from the series dc bus.

13. The power generation network of claim 11, wherein the controller is a centralized controller comprising a single controller linked to each of the converter systems.

14. The power generation network of claim 11, wherein the controller is a distributed controller comprising a plurality of local controllers each of which is collocated with and linked to one of the converter systems.

15. The power generation network of claim 12, wherein the information relating to the aggregate power drawn from the series dc bus is provided to the controller by a grid-side converter that draws power from the series dc bus.

16. The power generation network of claim 15, wherein the controller is operable to determine the mode of the bi-directional converter of each converter system based on the aggregate power draw information received from the grid-side converter, the actual power of each of the ac sources, and the reference power values assigned to the converter systems so that the rectifiers output the same current even if the ac power sources generate unequal power.

17. The power generation network of claim 12, wherein the controller is operable to:
determine the reference power values assigned to the converter systems based on the aggregate power draw information and voltages of the ac sources.

18. The power generation network of claim 12, wherein the information relating to the aggregate power drawn from the series dc bus comprises maximum total power that can be generated by the ac sources coupled to the series dc bus, the voltage of the parallel bus, current at a grid-side parallel bus converter coupled to the parallel bus, the voltage of the ac sources and the total voltage of the series dc bus.

19. The power generation network of claim 11, wherein the controller is operable to determine the reference power values assigned to the converter systems so that the ac sources operate at a respective maximum power point for each of the ac sources.

20. The power generation network of claim 11, wherein the controller is operable to:
adjust the amount of power transferred by each of the bi-directional converters into the parallel bus;
observe changes in the actual power locally generated by the ac sources in response to the adjustments made to the amount of power transferred by each of the bi-directional converters into the parallel bus; and
set the mode of the bi-directional converters based on the adjustments and observations made by the controller.

21. The power generation network of claim 10, wherein the series dc bus and the parallel bus are coupled to the same grid via respective grid-side converters and the parallel bus delivers auxiliary power from the power generation network to the grid.

22. A method of transmitting power from a plurality of ac sources to a grid, each of the ac power sources being coupled to a first set of terminals of a respective converter system, a second set of terminals of each of the converter systems being coupled in series with a series dc bus, and a third set of terminals of each of the converter systems being coupled in parallel with a parallel bus, the method comprising:
transferring power from the ac sources to the series dc bus through the first and second sets of terminals of the converter systems;
transferring power from each of the ac sources generating power above a reference power value assigned to the converter system coupled to that ac source to the parallel bus through the first and third sets of terminals of the converter systems coupled to each ac source generating power above its reference power value, the power transferred to the parallel bus not having been injected into the series dc bus; and
transferring power from the parallel bus to the series dc bus through the second and third sets of terminals of each of the converter systems coupled to an ac source generating power below its reference power value.

23. The method of claim 22, further comprising:
determining the reference power values assigned to the converter systems based on information relating to aggregate power drawn from the series dc bus, so that the converter systems output the same current to the series dc bus even if the ac power sources generate unequal power.

24. The method of claim 22, further comprising:
adjusting the amount of power transferred by each of the converter systems into the parallel bus;
observing changes in the actual power locally generated by the ac sources in response to the adjustments made to the amount of power transferred by each of the converter systems into the parallel bus; and
configuring each of the converter systems to transfer power to or from the parallel bus.

\* \* \* \* \*